3,141,039
PREPARATION OF UREA NITRATE
Roger L. Weichman and William L. Fierce, both of Crystal Lake, Ill., assignors to The Pure Oil Company, Chicago, Ill., a corporation of Ohio
No Drawing. Filed Apr. 23, 1962, Ser. No. 189,269
5 Claims. (Cl. 260—553)

This invention relates to new and useful improvements in methods for the preparation of urea nitrate.

Urea nitrate is a compound that has assumed some considerable importance as an intermediate in the preparation of explosives, as a color stabilizer in vinyl halide resins, and as a fertilizer. The preparation of nitrourea, for example, requires urea nitrate as a starting material. In the past, urea nitrate has been prepared by reaction of urea with nitric acid in aqueous solution. Such a method has a disadvantage in that urea nitrate is soluble in water to a substantial extent and it is difficult to separate urea nitrate from water-soluble impurities. In Spaeth, U.S. Patent 2,279,765, there is described a process for the preparation of urea nitrate by reaction of urea with nitric acid in a non-aqueous reaction medium, such as acetic or propionic acid.

One of the objects of this invention is to provide an improved method for the preparation of urea nitrate which possesses distinct economic advantages from the standpoints of yield and efficiency.

A further object of this invention is the provision of an improved method for the preparation of urea nitrate by reaction of urea with nitrogen dioxide.

A feature of this invention is the provision of a process wherein urea and nitrogen dioxide are reacted in solution in glacial acetic acid at a temperature of about 17° to 70° C.

A further feature of this invention is the provision of an improved process wherein urea and nitrogen dioxide are reacted in solution in glacial acetic acid, and the urea nitrate which precipitates is separated by settling, filtration, or centrifugation, and washed free of acetic acid.

Other objects and features of this invention will become apparent from time to time throughout the specification and claims as hereinafter related.

This invention is based upon our discovery that urea nitrate can be prepared in almost quantitative yield by reaction of nitrogen dioxide with urea in solution in glacial acetic acid at temperatures in the range from about 17° to 70° C. We have found that when urea is dissolved in glacial acetic acid and nitrogen dioxide is bubbled therethrough, preferably with agitation, urea nitrate is formed as a reaction product and precipitates from solution. The urea nitrate which is formed is then separated by settling and decantation, or by filtering or centrifuging. The urea nitrate may contain a small amount of absorbed or entrained acetic acid and can be further purified by water washing.

In this reaction, we have not established conclusively the mechanism by which urea nitrate is formed. In fact, it is quite unexpected that urea nitrate should be formed by the reaction of urea and nitrogen dioxide since there is nothing present in the reaction system which would be expected to convert the nitrogen dioxide to nitric acid. We believe that the reaction may take place by the following series of reactions:

(1)    $(NH_2)_2CO + NO_2 \rightarrow N_2H_4 + CO_2 + NO$
(2)    $N_2H_4 \rightarrow N_2 + 2H_2$
(3)    $4(NH_2)_2CO + 6NO_2 + 2H_2$
       $\rightarrow 4(NH_2)_2CO \cdot HNO_3 + N_2$ Adding the above equations together gives:

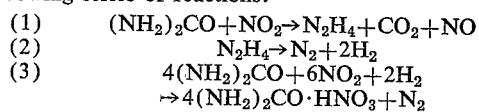
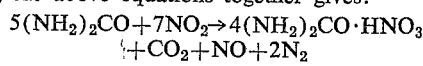

While the exact source of the hydrogen used in forming the nitric acid is not known with certainty, our present information indicates that the above overall equation is valid. Evidence in support of this conclusion is: (a) small yields of hydrazine can be produced by bubbling $NO_2$ through refluxing glacial acetic acid containing dissolved urea, and (b) infrared analysis of the product gases from our reaction show them to contain significant quantities of both $CO_2$ and $NO$. Furthermore, the addition of hydrogen to the charged gas did not affect the reaction. Adequate hydrogen is apparently produced by degradation of hydrazine according to Equation 2 above. It is probable that nascent hydrogen rather than molecular hydrogen is involved in the reaction. In the experimental examples which follow, the yields of urea nitrate are calculated on the above overall reaction. The following non-limiting examples are illustrative of the scope of this invention.

*Example I*

A three-necked, 500 ml. flask, equipped with a mercury-sealed stirrer, reflux condenser, thermometer and fritted glass bubbler, was charged with 19.9 g. of urea and 200 ml. of glacial acetic acid. Through the stirred solution, maintained at 25° C., was bubbled a gaseous mixture of nitrogen dioxide (about 50 cc./min.) and helium (50 cc./min.) for one hour. The urea was completely soluble in the acetic acid. During the run, the brown color of nitrogen dioxide was not observed in either the urea solution or the effluent gas, indicating 100% consumption of the nitrogen dioxide. A finely divided white solid, which increased in quantity as the run progressed, appeared in the solution after about 20 minutes. A total of 6.7 g. of this solid was recovered from the solution by filtration. The properties of the solid and its infrared spectrum identified it as urea nitrate.

*Example II*

Another experiment, similar to Example I above, was carried out in the presence of hydrogen gas to determine whether the hydrogen would have a beneficial effect on urea nitrate yields. A 500-ml., three-necked flask, equipped with mercury-sealed stirrer, thermometer, water-cooled condenser, and bubbler tube, was charged with 19.8 g. urea and 200 ml. of glacial acetic acid. Through the stirred solution, maintained at 26° C., was bubbled a gaseous mixture of helium (50 cc./min.), hydrogen (100 cc./min.), and $NO_2$ (48 cc./min.). At no time during the run was the brown color of nitrogen dioxide observed in the solution or the effluent gas, indicating a quantitative consumption of nitrogen dioxide. Samples of the effluent gas were taken after 20 and 60 minutes. Finely divided urea nitrate, which increased in quantity as the run progressed, appeared in the flask after 10 to 15 minutes. A total of 5.8 g. of urea nitrate was recovered from the solution by filtration. Analysis of the gas samples by infrared spectroscopy showed them to contain approximately 5–10% $CO_2$ and 15% $NO$. Hydrazine, carbon monoxide, nitrous oxide, nitrogen dioxide, and ammonia were not detected. The yield of urea nitrate in this experiment was substantially the same as in Example I, calculated on the nitrogen dioxide (the limiting reactant) charged to the respective experiments. The yield of urea nitrate, including that retained in solution, in both examples is in excess of 95%, calculated on nitrogen dioxide charged to the reaction, in accordance with the above-noted overall equation.

*Example III*

In another experiment, the procedure of Example I was followed except that the reaction was carried out under reflux conditions (121° C.). A three-necked, 500-ml. flask, equipped with a mercury-sealed stirrer, reflux condenser, thermometer, and fritted-glass bubbler, was charged with 29.3 g. of urea and 200 ml. of glacial acetic acid. Through the stirred solution at reflux temperature (121° C.) was bubbled a gaseous mixture of nitrogen dioxide (52.4 cc./min.) and helium (50 cc./min.) for one hour. The urea was completely soluble in the refluxing acetic acid. The brown nitrogen dioxide color was not observed in the urea solution or in the effluent gas, thus indicating a quantitative consumption of nitrogen dioxide. The amount of nitrogen dioxide charged charged was 5.9 g. No solid settled out of the reaction mixture on cooling as in Example I, and no urea nitrate was observed to form in the reaction. Nitric oxide and carbon dioxide were detected in the effluent gas, along with a small amount of hydrazine.

*Example IV*

The procedure of Examples I and III was repeated using other solvents for urea in carrying out the reaction. The reaction was attempted using pyridine as a solvent, both at reflux temperature and at 60° C. No urea nitrate was formed in either run. The reaction was also attempted using carbon tetrachloride as solvent for urea, both at reflux temperature and at 25° C. No urea nitrate was observed to form in either of these experiments.

From the foregoing examples, it is seen that our process produces excellent yields of urea nitrate when nitrogen dioxide is reacted with urea in solution in glacial acetic acid at moderate temperatures. The reaction can be carried out at any temperature in the range from the melting point of acetic acid (17° C.) up to about 70° C. At temperatures above about 70° C., the reaction which takes place is primarily an oxidation reaction with little or no formation of urea nitrate. The reaction is limited to one in solution in glacial acetic acid as evidenced by the lack of formation of the urea nitrate in other solvents. While the process has been described as being carried out in a batch operation, it should be obvious to those skilled in the art that continuous operation of the process is feasible. Urea can be continuously fed to the glacial acetic acid solvent, reacted with nitrogen dioxide, and the urea nitrate product filtered therefrom. The filtrate from the reaction step would then be recycled for addition of more urea for reaction. Once the process is underway, the solution becomes saturated with urea nitrate and so there is no holdup of urea nitrate in a continuous process as in a batch process.

While we have described our invention fully and completely with special emphasis upon several preferred embodiments, we wish it to be understood that within the scope of the appended claims this invention may be practiced otherwise than as specifically described herein.

The embodiments of the invention in which an exclusive property or privilege is claimed are defined as follows.

1. A method for preparing urea nitrate which comprises reacting nitrogen dioxide with urea in solution in glacial acetic acid at about 17 to 70° C. and recovering the urea nitrate which forms.

2. A method in accordance with claim 1 in which the reaction is carried out by bubbling gaseous nitrogen dioxide through a solution of urea in glacial acetic acid with agitation.

3. A method in accordance with claim 1 in which the reaction is carried out using an amount of nitrogen dioxide not substantially in excess of stoichiometric.

4. A method in accordance with claim 1 in which the product urea nitrate precipitates from solution and is mechanically recovered.

5. A method in accordance with claim 4 in which the urea nitrate is washed with a solvent for acetic acid and then dried.

References Cited in the file of this patent

UNITED STATES PATENTS 2,279,765    Spaeth _____ Apr. 14, 1942

OTHER REFERENCES

Riebsomer: Chemical Reviews, volume 36 (1945), pages 159–160.

Groggins: Unit Processes in Organic Synthesis (1947), pages 18–19.

White et al.: J. Amer. Chem. Soc., volume 79 (1957), pages 5832–33.